Feb. 9, 1971 N. C. WYETH 3,562,075
DELAMINATING DEVICE
Filed Jan. 15, 1968 3 Sheets-Sheet 1
FIG.1
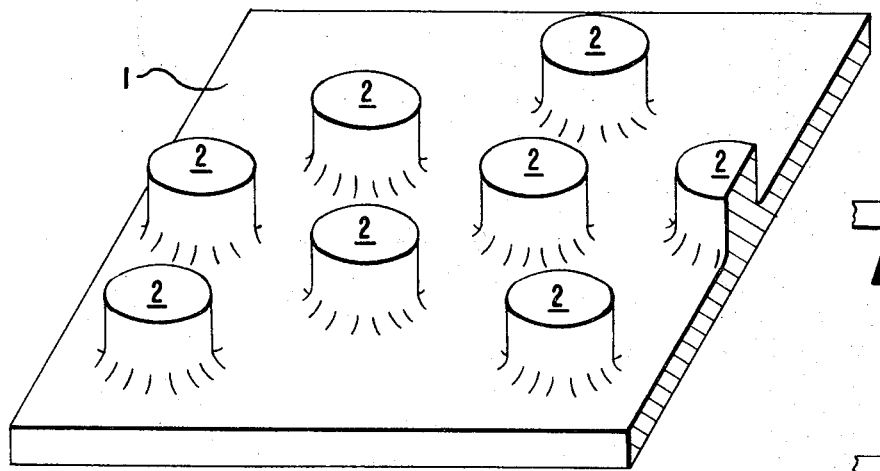
FIG.2
FIG.3
FIG.4
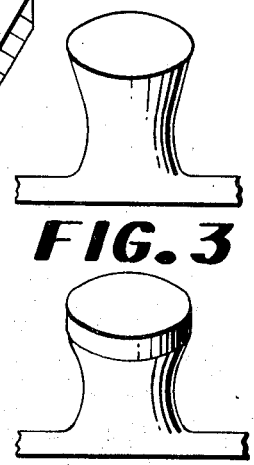
FIG.5
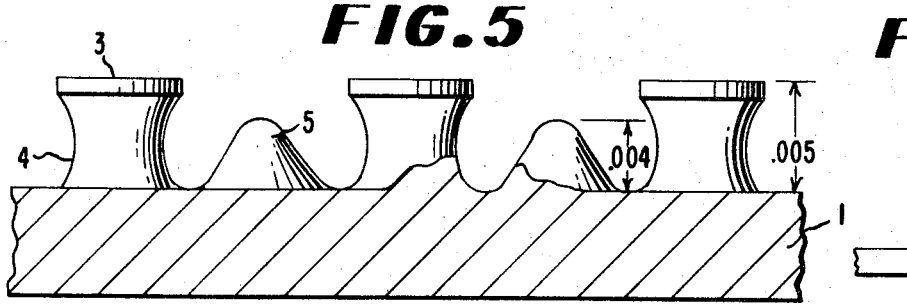
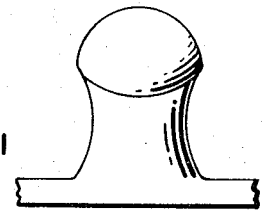
FIG.6
FIG.7
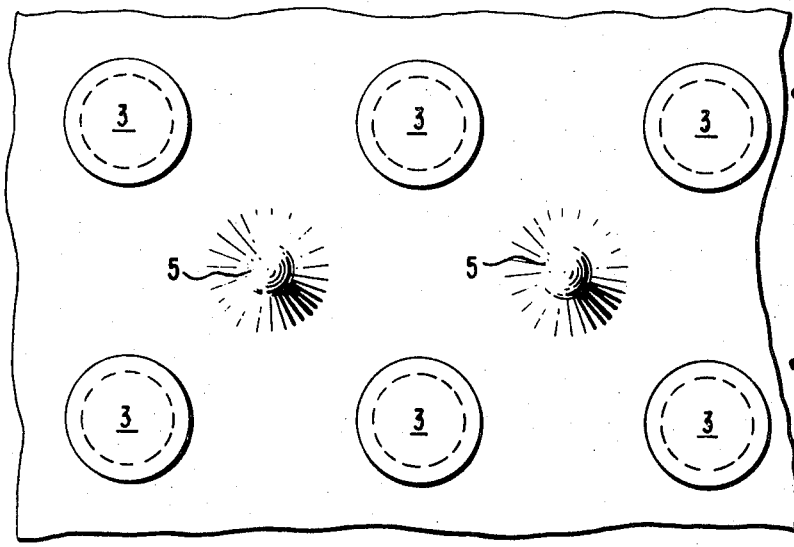
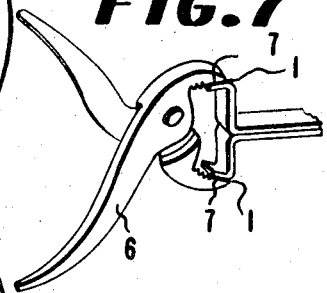
INVENTOR
NATHANIEL CONVERS WYETH
BY Lynn Barratt Morris
ATTORNEY Feb. 9, 1971 N. C. WYETH 3,562,075
DELAMINATING DEVICE
Filed Jan. 15, 1968 3 Sheets-Sheet 2

INVENTOR
NATHANIEL CONVERS WYETH

BY Lynn Barrett Morris
ATTORNEY

Feb. 9, 1971    N. C. WYETH    3,562,075
DELAMINATING DEVICE
Filed Jan. 15, 1968    3 Sheets-Sheet 3
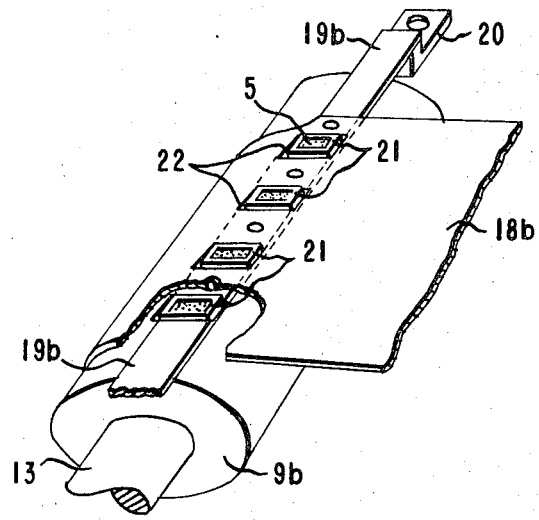
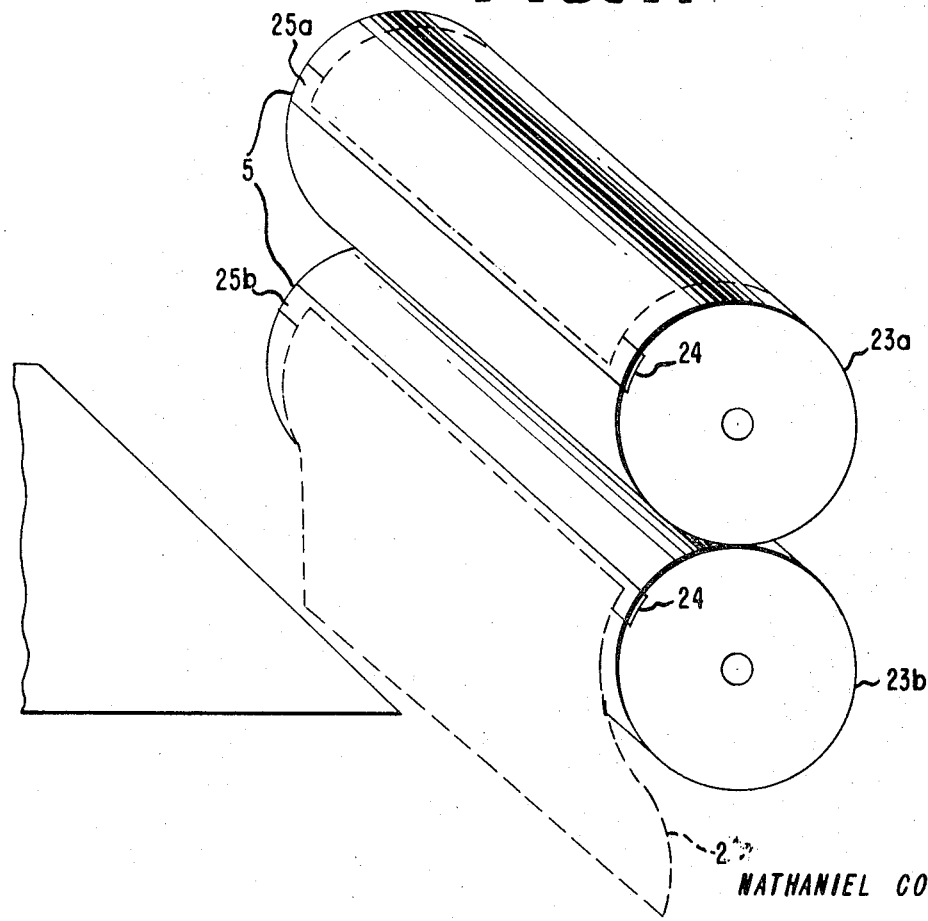
INVENTOR
NATHANIEL CONVERS WYETH
BY Lynn Barrett Morris
ATTORNEY

United States Patent Office 3,562,075
Patented Feb. 9, 1971

3,562,075
DELAMINATING DEVICE
Nathaniel Convers Wyeth, Mendenhall, Pa., assignor to
E. I. du Pont de Nemours and Company, Wilmington,
Del., a corporation of Delaware
Filed Jan. 15, 1968, Ser. No. 697,903
Int. Cl. B32b
U.S. Cl. 156—584                    6 Claims

ABSTRACT OF THE DISCLOSURE

In a device for delaminating a multilayered element having a strippable stratum and a plastic film outer stratum, a surface gripping member characterized in that its surface has a plurality of spaced protrusions of small surface area which can be forced into the surface of the element. The gripping member may be in a tool (plier type) on a roller or on a belt of a continuous type delamination machine.

BACKGROUND OF THE INVENTION

Field of the invention

This invention deals with devices for use in the art of stripping or peeling of laminated sheets and more particularly the photosensitive sheets or webs having a strippable stratum.

Description of the prior art

Considerable difficulty has been experienced in the art of delaminating multilayer plastic films. This is particularly true where the plastic layers are very thin. Most conventional delaminating techniques are not effective, since they do not provide adequate means to initiate delamination. For example, use of suction cups has disadvantages due to the flexibility of the base film. The use of pressure-sensitive adhesive layers has advantages but requires prior preparation of the multilayer elements. Furthermore, the film surface must be clean and non-reactive with the adhesive to be used. Where the multilayer film is heat treated just before delamination, the use of a pressure-sensitive adhesive to initiate delamination is not practical since most such adhesives and tapes coated therewith degrade rapidly at elevated temperature, lose their strength and contaminate the surfaces to which they are attached. Application of an adhesive in a continuous process would involve frequent cleaning of the machine roll surfaces as well as cleaning of the film structure; hence, adhesive tape is not a desirable delamination technique.

Another commonly used delamination technique is mismatching the edges of the laminated structure to form a tear-tab. This obviates some of the disadvantages of adhesive tape, but requires special cutting equipment which markedly increases the cost of the product.

The photocopying and image transfer technology has resulted in many versatile and useful products. One such product is a photopolymer reproduction film. This film has a laminated structure consisting of a thin transparent layer of photopolymerizable material between a hydrophobic polymer film base and a cover sheet. In use, an image-containing original is placed over the laminated element and exposed briefly to an ultraviolet light source. After exposure, the laminate is allowed to cool and then the cover sheet is pulled away to reveal a positive copy of the original in the photopolymer. During the delamination, it is important that the cover sheet be pulled at a controlled predetermined angle in a uniform uninterrupted manner, otherwise, background streaks may be formed by the irregular surfaces of the cover sheet rubbing against the tacky photopolymer surface. Consequently, there is a great need for reliable, simple, versatile means of delaminating a structure of this type.

Accordingly, it is a principal object of this invention to provide a positive means for initiating delamination of thin, flexible, laminated materials by a gripping means which may selectively warm the material and delaminate in a uniform continuous rate.

The following references deal with delamination of multilayer sheets and webs:

Scott, U.S. 2,363,442—Nov. 21, 1944, relates to means for stripping laminated paper stock by first heating the paper stock to soften the adhesive binding of the laminated structure then radially separating the laminated structure by a rotary suction head where the suction forces created in the port of the rotary head will cause the outer strip of the laminated structure to adhere to the outer peripheral surface of the head and delaminate as the rotary suction wheel turns.

Allyn, U.S. 1,614,024—Jan. 11, 1927, relates to method of treating automotive tires wherein one step in the method is a stripping step. Stripping is accomplished by the use of stationary clamping jaws which grip the free end of the outer layer of rubber while the main body of the tire is caused to rotate thereby delaminating the outer layer.

Keyes, U.S. 1,483,181—Feb. 12, 1924, relates to a labelling machine. The label is caused to separate from its carrier, a web support, by causing a roll in contact with the label to rotate with a peripheral speed greater than the speed of the traveling support thereby frictionally delaminating the label from its carrier.

SUMMARY OF THE INVENTION

According to the invention, there is provided in a device for laminating a multilayered element, e.g., a sheet or web having a tension-strippable stratum and a plastic (i.e., pressure-flowable) film outer stratum, a surface gripping member the surface of the member being characterized in that it has a plurality of spaced protrusions of small surface area which can be forced into the surface of the sheet or web.

Preferably, the protrusions are equally spaced and are of uniform cross-section, the cross-section at the surface being greater than beneath the surface. The protrusions may have an average cross-section of 10 to 4 mils, or less. For example, they may correspond to halftone dots. Between the protrusions and below the surface of the member, there may be other protrusions to force plastic material toward, and to grip, the surface meeting protrusions.

BRIEF DESCRIPTION OF THE DRAWINGS

FIG. 1 is an enlarged isometric view of a portion of the gripping member showing a pattern of the protrusions;

FIGS. 2, 3 and 4 are isometric views in profile of various protrusions with enlarged heads for engaging sheet material;

FIG. 5 is a vertical elevation with parts in section of enlarged protrusions with interdispersed diverting protrusions below the surface plane of the plastic surface engaging protrusions;

FIG. 6 is a plan view of a fragment of the protrusions of FIG. 5;

FIG. 7 is an isometric view of a pair of pliers the jaws of which have web-gripping members of the invention showing a delaminated portion of a narrow sheet structure;

FIG. 10 is an isometric view with parts in section of the web engaging roll of FIGS. 8 and 9; and FIG. 11 is an isometric view of a pair of web engaging rolls with web-gripping members in their surfaces.

DESCRIPTION OF THE PREFERRED EMBODIMENTS

Figure 8:
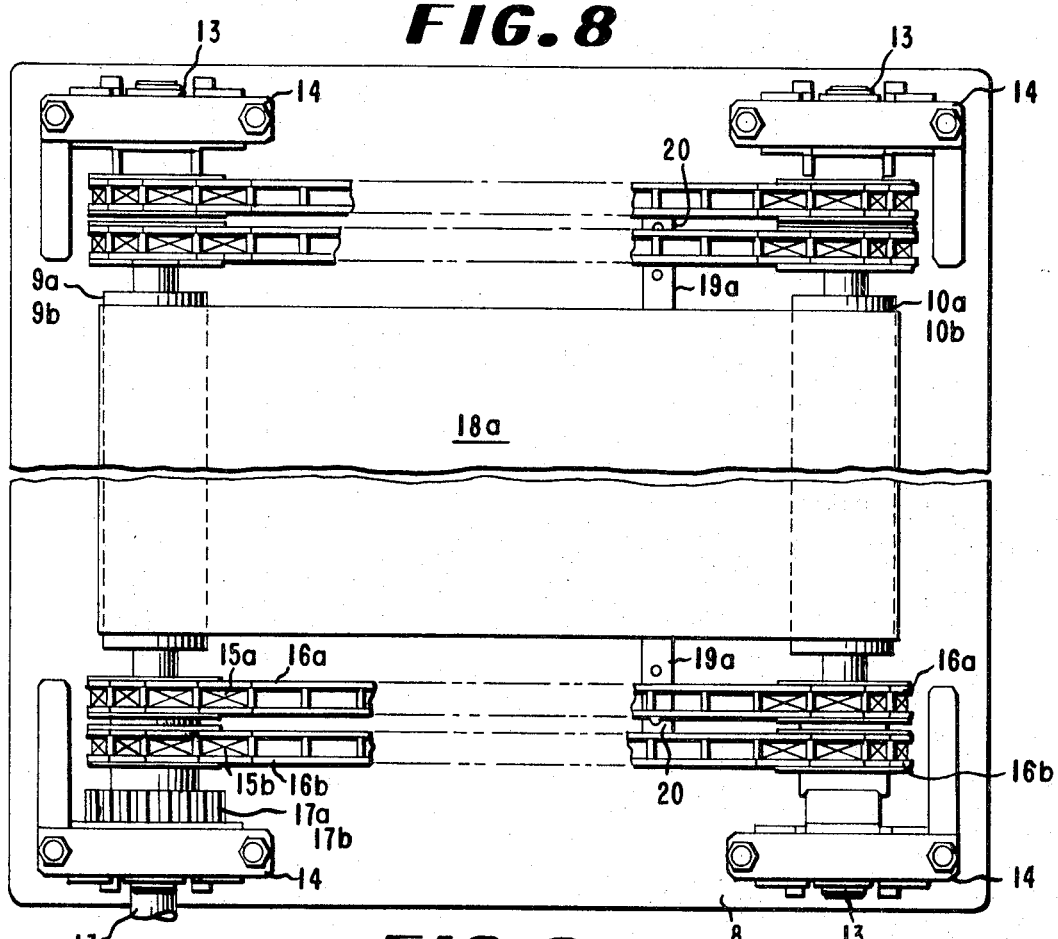

Before describing in detail the various embodiments of this invention that are shown in the accompanying drawings, the use of the invention for delamination of a laminated web of a photopolymerizable layer between two plastic webs made of polyethylene terephthalate such as that described in Colgrove U.S.P. 3,353,955 will be discussed. The photopolymerizable layer functions as an adhesive binder and in order to initiate delamination it is necessary to break the bond between the layer and the surface of the adjacent web. According to this invention, the bond can be broken by means of a pattern of the web-gripping members having minute protrusions which are forced into the outer surfaces of a web or webs. When the protrusions are forced into the outer surface of the plastic webs, the plastic material tends to "cold-flow" around the protrusion and supply enough gripping force to delaminate the web upon moving the web-gripping surface away from the plane of the web. The web-gripping members are useful with any plastic material that exhibits cold-flow around the protrusions. By having a large number of minute protrusions per square inch of surface, a substantial web-gripping force is obtained.

With reference to FIG. 1 of the drawing, a strip of metal 1, preferably high strength alloy steel, has at least one surface modified to provide minute protrusions 2. These protrusions can be produced by selectively photoetching one surface of the high strength alloy steel strip bearing a half-tone resist pattern. Preferably the protrusions 2 are formed on only one surface while the other surface is affixed to a tool, roll or other surface. Each protrusion can be formed with an undercut or negative tapered profile or re-entrant angle so that when the protrusion is driven into the external surface of a plastic film, the plastic material will cold-flow and lock around each protrusion to provide a positive grip. Collectively, the gripping action of the protrusions will provide sufficient gripping force to permit delamination of the plastic layer from an appertaining strippable layer.

The effectiveness of the film gripping member is a function of size, density and profile. Any profile having negative tapered, re-entrant angle or enlarged head is highly desirable. FIGS. 2, 3 and 4 show various examples of protrusion profiles that exhibit high film gripping capabilities. Each peg profile embodies a characteristic negative tapered profile which can be fabricated by successive preferential photoetching of a metal strip material followed by a light mechanical swaging, if desired.

In some instances, it is recognized that the physical properties of certain surface materials may resist the desired penetration and degree of cold-flow displacement necessary for gripping without recourse to massive compressive loading. To overcome the disadvantage of requiring a high compressive load, the sheet engaging surface may be adapted with a modified pattern designed to facilitate penetration. FIG. 4 illustrates such a modified pattern and involves protrusions with a mushroom head and a negative taper or undercut portion 4. Spaced in between protrusion 5 are short, parabolic, protruding peaks 5 which engage the film surface and urge the plastic material into the undercut areas surrounding peg 3. This modified pattern may be fabricated similarly by selective photoetching techniques.

An etching mask is used with a pattern to mask spots having a diameter the size of the desired biting peg interspersed with a pattern of spots ranging from ½ to ⅔ the diameter of the biting peg. The etching solution removes the unmasked areas and undercuts masked areas. In areas having the smaller diameters the undercutting effectively cuts off the top of the pedestal. When etching is completed, the pattern remaining is a standing pedestal having a certain degree of undercut to its profile and a smaller pedestal having its top etched away and having a profile in the form of a nodule.

Protrusions shown in FIG. 1 having a slightly tapered body portion with sharp-edged, flat heads provide adequate gripping action for most applications and are preferred from the standpoint of economy and ease of fabrication. Best results are obtained when the distribution pattern is random and at a density spacing not greater than the diameter of the protrusions which for simplicity are sometimes referred to below as pegs.

Depending on the type of laminated sandwich to be delaminated, a peg pattern may be tailored to accommodate such variables as sheet thickness, material and the strength of the bond holding the laminated sheets together. For example, consider the following. As the pegs are embedded into the plastic layers, the plastic material ahead of each peg is partially displaced laterally into the interstices. The movement of the surface material generates high shear stresses in the photopolymer layer, which is the laminate binder, and causes a breakdown of the adhesive bond between the outer plastic layer and the adhesive bonding material. Therefore, the amount of material flow is related to the force required to delaminate the element. Also related to the material flow is the density distribution of protrusions per unit area. The higher the density pattern the greater the reduction in the size of the spacing and the greater the tendency to restrict material flow. In addition, higher peg densities involve increased compressive loads for equal penetration. Conversely, lower peg densities induce less lateral flow of material, with reduced compaction and locking of the material around the pegs; consequently, there is insufficient gripping for delamination. Some balance between required compressive force and peg density must be achieved.

It is known that about 30,000 p.s.i. compressive stress will produce cold-flow deformation of polyethylene terephthalate material at room temperature. To displace the material with a single peg 0.006 inch in diameter requires about 1 to 2 pounds force. The magnitude of grip, that is, the force to withdraw an embedded peg is considerably less. Hence, a large number of pegs are required to produce sufficient gripping action.

It has been found that embedding forces of 2,000 to 10,000 pound per square inch will produce a 4 to 6 pound gripping force with peg pattern of FIG. 5 and peg density varying from 900 to 5,000 pegs per square inch, with a preferred density of 3,000 pegs per square inch with a head size of .006 inch in diameter and .005-inch high when working on a .005-inch thick polyester support.

In some instances, it is necessary to heat treat the laminated element prior to the act of delamination in order to lower the adhesive forces between the plastic film supports and the binding layer. In the case of engineering drawings or any sheet material of large dimension, the element may be rather unwieldy and hard to handle. Since it is important that the sheet material be peeled uniformly and uninterruptedly in order to avoid streaks and other flaws, delamination can best be done by mechanical assistance.

One embodiment which adapts a photoetched delamination surface to a mechanical device is shown in FIG. 7. This device is a pair of pliers 6, which has a plastic sheet gripping member metal strip 1, affixed to each jaw. The strips 1 can be attached to the jaws by spot weldments along the edges 7. In operation, a multilayer film strip to be delaminated is placed between the jaws of the pliers, and the jaws are pressed down against the multi-layered structure. The pegs embed themselves into the external surfaces of the multilayered structure until approximately 25% of the peg height has penetrated the surface material. As the pegs are embedded the plastic material ahead of each peg is partially displaced by lateral cold-flow around each peg to provide a gripping force. The jaws of the pliers are then opened and the plastic surfaces remain attached to their respective jaws and the multilayered element becomes delaminated in the vicinity of the pliers. The separated sheets can then be grasped by hand and stripping completed.

Figure 9:
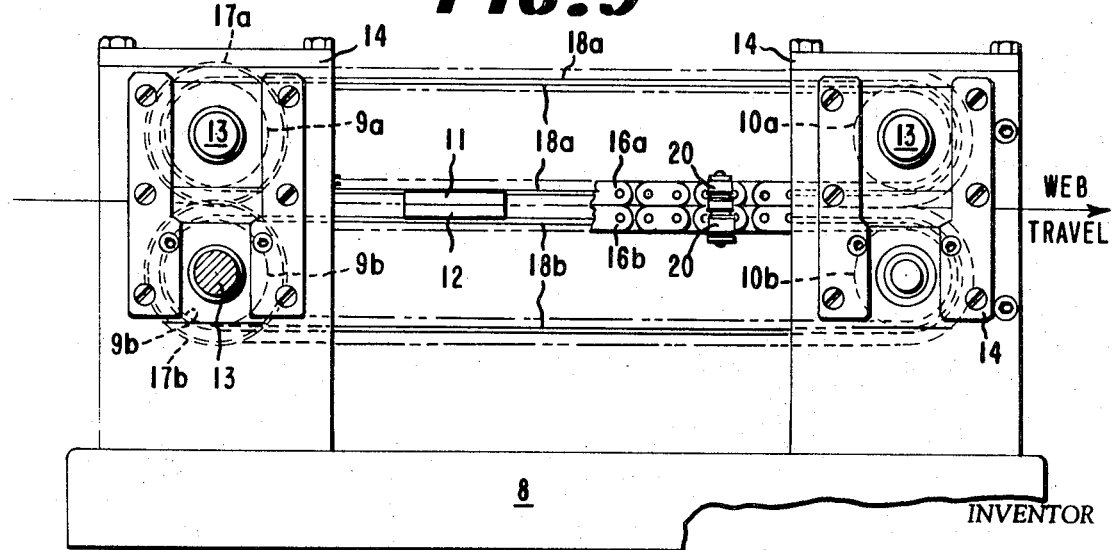
FIG. 9 is an elevation of the machine of FIG. 8.

FIGS. 8, 9 and 10 show still another embodiment of a delaminator, namely, a belt-type using the sheet engaging surface of the belt for aiding delamination. The apparatus comprises a rigid frame 8 which supports spaced rolls 9a, 9b, 10a and 10b. Rolls 9a, 9b, 10a and 10b are generally hollow cylinders with flanges welded at the ends to which are fixed shaft extensions 13. The four rolls are rotatably journaled on the extensions 13 in conventional antifriction bearing supports 14 that are attached to the frame 8 by threaded fasteners. Keyed along the extensions 13 of upper rolls 9a, 10a and lower rolls 9b, 10b are sprockets 15a and 15b. These sprockets, in turn are operatively connected to endless roller chains 16a and 16b which functionally drive upper rolls 9a, 10a and lower rolls 9b, 10b in unison. Upper and lower rolls 9a, 9b are mechanically coupled by spur gears 17a and 17b which are keyed to the shaft extensions 13 along side sprockets 15a and 15b. This system is driven by means of a variable speed electric motor (not shown) which is coupled to the end of extension 13 of roll 9b in a conventional manner.

Travelling around upper rolls 9a, 10a and lower rolls 9b and 10b are endless belts 18a and 18b, respectively, which are made of woven cloth construction and extend the entire width of the rolls.

Both belts are driven around their respective rolls by means of lateral metal bars 19a and 19b that are connected to roller chains 16a and 16b. The ends of strips 19a and 19b are affixed to brackets 20 which are attached to a modified chain length particularly designed for this purpose. As best shown in FIG. 10, bars 19a and 19b are constructed with raised pads 21 to which are bonded by spot welding spaced web gripping metal strips 1. Belt 18b is attached to 19b by means of a plurality of conventional fasteners such as rivets at points spaced between the pads 21. The sheet gripping surfaces 1 are exposed and extend through the clearance apertures 22 that are cut into belt 18b. Upper belt 18a is constructed in an identical manner. Referring again to FIG. 8, strips 19a and 19b are shown affixed to the roller chains opposite each other so that they pass through the nip of rolls 9a and 9b and converge and co-act on the sheet material being processed simultaneously. In the embodiment shown, rolls 9a and 9b are preloaded to produce the required compressive loading. For increased loading, however, rolls 9a and 9b can be connected to pressure applicator means such as hydraulic actuators (not shown).

For processing sheet material requiring an elevated temperature to delaminate, strip heaters 11 and 12 are suitably attached to frame 8 adjacent belts 18a and 18b. Heaters 11 and 12 may be of the electrical resistance type which are operatively connected to a variable electric power supply (not shown).

In operation, the leading edge of a multilayered element is fed into the nip of rolls 9a and 9b at about the same time as bars 19a and 19b with web gripping members are entering the nip. An interlock mechanism (not shown) may be incorporated into this machine which will permit feeding a sheet to the machine when bars 19a and 19b are in proper position. As the multilayered element contacts the delamination bars and passes through the nip zone, the pegs of the web gripping surfaces are embedded into the top and bottom sheets of the element.

The pegs remain embedded in the element as it is conveyed past the heaters 11 and 12. The element is heated and then continues on the conveyor belt through the nip zone of rolls 10a and 10b where the strips 19a, and 19b continue to travel around with their respective belts 18a and 18b. The nip separation of rolls 10a and 19b is preset to accommodate the thickness of the element and strips 19a and 19b. As the surface layers of the element move with the belt on which they are respectively attached, the multistructured element is radially delaminated.

A similar operation can be performed on a more compact and simplified machine shown in FIG. 11. In this figure, a multilayered element is fed into the nip of a pair of opposing rolls 23a and 23b which are suitably journalled and connected to a drive mechanism not shown. The rolls may be adapted with internal heating means such as electrical resistance coils or heated fluid passageways for processing at elevated temperatures. The circumferential surface of each drum is modified by a narrow slot or recess 24 for accommodating therein bars 25a and 25b that have web gripping surfaces or members. The structure and function of members 1 are similar to those described in the operation of the embodiment shown in FIG. 8. An element to be delaminated is fed into the nip of rolls 23a and 23b at about the time bars 25a and 25b enter the nip. Compression takes place in the nip and delamination of the element takes place in the short zone following the nip where radial delamination is accomplished.

Below are results of delamination tests run on film samples measuring ½" wide and 3" long. Each film sample is a laminated film of two .001-inch thick polyethylene terephthalate outer films and an intervening layer of photopolymerizable material. Delamination was performed with a hand operated tool similar to the modified pliers shown in FIG. 7. The sheet gripping surfaces were approximately 5/16" square containing 4,200 pegs per square inch having profiles similar to those shown in FIG. 2. The pegs were essentially .006 inch in diameter and were .006" high. Each sample was subjected to 300 lbs. compressive force.

TABLE I

| | Imbed | Peel | Hold time (sec.) | Temperature ° C. | Separation |
|---|---|---|---|---|---|
| Sample No.: | | | | | |
| 1 | Cold | Cold | | 25 | Good. |
| 2 | Hot | Hot | 10 | 88 | Do. |
| 3 | Hot | Cold | 10 | 88 | Very good. |
| 4 | Hot | do | 8 | 89 | Do. |
| 5 | Cold | Hot | | 87 | Partial. |

A series of tests were conducted on film samples of varying thicknesses to determine the compression load required to embed a pattern of pegs into a polyethylene terephthalate material where the pegs were embedded to about 25% of their height. In each test, a pattern consisting of 4,300 pegs per square inch was employed. The pegs were of a cylindrical profile as shown in FIG. 2 and were .006 inch in diameter and .006 inch high. The test samples were made on single sheets of .005" thick polyester film and also on laminated sandwiches of exposed film made up of a .004" thick polyethylene terephthalate support, a .0005" layer of photopolymer material and a .001" polyethylene terephthalate cover sheet.

In the case of the laminated films, the samples were delaminated by two methods. One method required the use of the apparatus of this invention and the other method was a conventional delamination process where a piece of adhesive tape is attached to the layer to be delaminated and the amount of force required to pull the adhesive tape and the attached layer were measured. The measured pull force in each instance where adhesive tape was used required a force of 14 to 16 pounds. In the case of delamination by the use of the apparatus of this invention no force greater than 3 pounds was required to accomplish the same result. The table below shows the results of the tests that were used to determine the compression loads that were required to embed a pattern of pegs to about 25% of their height. As will be seen from the table, the thinner film laminates are peeled apart with considerably lower gripping forces. This appears to be due to the effect of high shear stress being transmitted through the thinner sheet material into the photopolymer layer.

TABLE II

| Compression load (p.s.i.): | Depth penetration (mils) | Film type | Film thickness, inch | Gripping force (lbs.) |
|---|---|---|---|---|
| 5,000 | ¾–1 | Single sheet | .005 | 1 |
| 6,000 | 1½ | ___do___ | .005 | 5 |
| 5,000 | .8 | Laminated sandwich | .0065 | 3 |
| 2,500 | .6 | ___do___ | .0025 | (¹) |
| 3,500 | .8 | ___do___ | .0025 | (¹) |

¹ Less than.

An advantage of this invention is that it provides simple and reliable means for peeling apart very thin, flexible, laminated sheet materials. Furthermore, delamination can be accomplished without prior preparation of the sheet material. The means may be employed in an environment varying over a wide range of temperatures and delamination according to the teaching of this invention does not produce chips, or dust and is ideally suited for delamination in a clean environment. The tools and machines of the invention have a rather simple construction and are dependable in use. The tools and machines, moreover, are useful for delamination of dry-stripping photographic films.

The embodiments of the invention in which an exclusive property or privilege is claimed are defined as follows:

1. A surface gripping device for delaminating a multilayer element having a dry strippable stratum and at least one plastic film outer stratum, said device having a surface gripping member composed of hard spaced minute protrusions that are round in cross-section and have an average diameter of .005 to .020 inch, a height of .003 to .015 inch, and a density of 900 to 5,000 protrusions per square inch, with the heads of the protrusions being in the same plane.

2. A surface gripping device according to claim 3 having other protrusions between and below the plane of the first-mentioned protrusions.

3. A plier tool wherein each of the inner gripping surfaces has affixed thereto a surface gripping member as defined in claim 3.

4. A device for delaminating a multilayer element having a dry strippable stratum and at least one plastic film outer stratum comprising rolls having at least one surface gripping member as defined in claim 3.

5. A device for delaminating a multilayer element having a dry strippable stratum and at least one plastic film outer stratum comprising a pair of belts having at least one surface gripping member as defined in claim 3.

6. A surface gripping member according to claim 3, wherein said round protrusions are reduced in cross-section a short distance below their heads.

References Cited

UNITED STATES PATENTS

| 1,070,241 | 8/1913 | Fischer et al. | 156—344 |
| 1,614,024 | 1/1927 | Allyn et al. | 156—344 |
| 2,590,747 | 3/1952 | Birdseye | 156—584 |
| 3,190,785 | 6/1965 | Comet | 156—584 |

SAMUEL FEINBERG, Primary Examiner

PO-1050
(5/69)

UNITED STATES PATENT OFFICE
CERTIFICATE OF CORRECTION

Patent No. 3,562,075            Dated   FEB. 9, 1971

Inventor(s) Nathaniel Convers Wyeth

It is certified that error appears in the above-identified patent and that said Letters Patent are hereby corrected as shown below:

Col. 7, first line after the Table, "1 Less than." should read --(1) Less than 1.--

Claim 2, line 1, "3" should read --1--.

Claim 3, line 3, "3" should read --1--.

Claim 4, line 4, "3" should read --1--.

Claim 5, line 4, "3" should read --1--.

Claim 6, line 1, "3" should read --1--.

Signed and sealed this 1st day of June 1971.

(SEAL)
Attest:

EDWARD M. FLETCHER, JR.
Attesting Officer

WILLIAM E. SCHUYLER, JR.
Commissioner of Patents